(12) United States Patent
Aidan et al.

(10) Patent No.: US 6,654,871 B1
(45) Date of Patent: Nov. 25, 2003

(54) DEVICE AND A METHOD FOR PERFORMING STACK OPERATIONS IN A PROCESSING SYSTEM

(75) Inventors: Fabrice Aidan, Raanana (IL); Yoram Salant, Rosh-Haain (IL); Mark Elnekave, Ramat-Gan (IL); Leonid Tsukerman, Haifa (IL)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/436,891

(22) Filed: Nov. 9, 1999

(51) Int. Cl.[7] ................................. G06F 9/42
(52) U.S. Cl. ................ 712/202; 711/132; 711/219; 712/233
(58) Field of Search .................. 708/494; 711/132, 711/219; 712/202, 233

(56) References Cited

U.S. PATENT DOCUMENTS

| | | | |
|---|---|---|---|
| 5,142,635 A | | 8/1992 | Saini |
| 5,287,309 A | | 2/1994 | Kai |
| 5,381,360 A | * | 1/1995 | Shridhar et al. ............ 708/491 |
| 5,687,336 A | | 11/1997 | Shen et al. |
| 5,706,491 A | | 1/1998 | McMahan |
| 6,205,539 B1 | * | 3/2001 | Allen et al. ................ 712/202 |

* cited by examiner

*Primary Examiner*—William M. Treat

(57) ABSTRACT

A method and a device for performing stack operations within a processing system. A first and second stack pointers point to a top of a stack and to a memory location following the top of the stack. A first stack pointer is used during pop operations and a second stack pointer is used during push operations. When a stack pointer is selected, it replaces the other stack pointer. The selected memory pointer is provided to a memory module in which a stack is implemented, and is also updated. When a pop operation is executed the updated stack pointer points to a memory location preceding a memory location pointed by the selected stack pointer and when a push operation is executed the updated stack pointer points to a memory address following that address.

15 Claims, 3 Drawing Sheets

DEVICE AND A METHOD FOR PERFORMING STACK OPERATIONS IN A PROCESSING SYSTEM

FIELD OF THE INVENTION

A device and a method for performing stack operations in a processing system, and especially a device and a method for allowing high-speed stack operations.

BACKGROUND OF THE INVENTION

Many processing systems have memory modules in which a stack is implemented. A stack is a data structure in which a value most recently stored is the first value to be retrieved. Some stacks grow towards lower addresses/ memory locations of a memory module and some stacks grow towards upper addresses of the memory module. Accordingly, the top of the stack is a memory location with the lowest or highest address of the stack where data is currently being stored.

There are two basic operations that are associated with a stack—a push operation in which a new value is added to the stack and a pop operation in which the value that is located at the top of the stack is retrieved. The new value is stored at a memory location following the top of the stack Usually, a stack pointer points to the top of the stack or to a memory location that follows the top of the stack. The first type of stack pointer enables fast pop operations while the second type enables fast push operations. When a stack grown toward upper addresses and the stack pointer points to the memory location that follows the top of the stack, a pop operation involves decrementing the stack pointer and moving the value stored at the top of the stack and a push operation involves writing data to the memory location pointer by the stack pointer and incrementing the stack pointer. This prior art approach is relatively time consuming.

Stack operations are extensively used in accordance with interrupts. Usually a plurality of registers, holding the status of the processing system are pushed to the stack and eventually are popped from the stack. When many registers store the processing system status, the execution of an interrupt is very time consuming.

There is a need to provide a high speed and an improved device and method for performing stack operations.

BRIEF DESCRIPTION OF THE DRAWINGS

While the invention is pointed out with particularity in the appended claims, other features of the invention are disclosed by the following detailed description taken in conjunction with the accompanying drawings, in which:

DESCRIPTION OF THE PREFERRED EMBODIMENT

Generally, the present invention provides a device and a method for performing high speed stack operations. The invention provides two stack pointers, a first stack pointer that points to the top of the stack and a second stack pointer that points to the memory location following the top of the stack. The two stack pointers are used during pop and push operations accordingly. There is no need to increment or decrement a stack pointer before it is being used. When a first stack pointer is selected, it is provided as a selected stack pointer to the memory module holding the stack, it replaces the second stack pointer and is updated. The updated stack pointer points to a memory location preceding the selected stack pointer. The updated stack pointer replaces the first stack pointer that was formerly provided as the selected stack pointer. When a second stack pointer is selected, it is provided as a selected stack pointer to the memory holding the stack, it replaces the first stack pointer and is updated. The updated stack pointer points to a memory location that follows the memory location pointer by the selected stack pointer. The updated stack pointer replaces the second stack pointer that was formerly provided as the selected stack pointer.

It should be noted that the particular terms and expressions employed and the particular structural and operational details disclosed in the detailed description and accompanying drawings are for illustrative purposes only and are not intended to in any way limit the scope of the invention as described in the appended claims.

Figure 1:
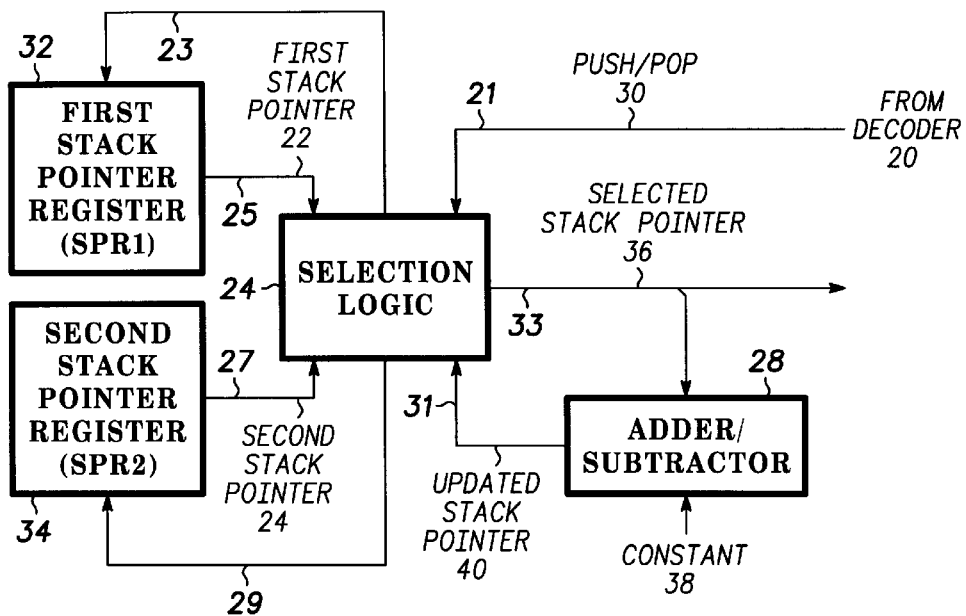
FIG. 1 is a block diagram of a device for performing stack operations within a processing system, according to a preferred embodiment of the invention.

FIG. 1 is a block diagram of a device 10 for performing stack operations within a processing system, according to a preferred embodiment of the invention.

Device 10 comprises of: decoder 20 for decoding an instruction and generating a control indicator (i.e.—PUSH/ POP) 30 calling for the stack operation, accordingly. First stack pointer register 22, for storing a first stack pointer 32. Second stack pointer register 26, for storing a second stack pointer 34. Adder/subtractor 28, for receiving a selected stack pointer 36 and a constant 38 and generating an updated stack pointer 40 according to the control indictor 30. Selection logic 24, for receiving control indicator 30 and accordingly selecting a selected stack pointer 36 out of the first and second stack pointers 32 and 34, sending selected stack pointer 36 to the stack pointer register that was not selected, sending selected stack pointer 36 to adder/subtractor 28 and sending updated stack pointer 40 from adder/subtractor 28 to the selected stack pointer register.

Selection logic 24 is coupled to decoder 20 via bus 21, for receiving control indicator 30, is coupled via buses 23 and 25 to first stack pointer register 22, is coupled via buses 27 and 29 to second stack pointer register 26, and is coupled via buses 33 and 31 to adder/subtractor 28.

Conveniently, first stack pointer 32 points to the top of the stack and the second stack pointer 34 points to the memory location following the top of the stack. When control indicator 30 calls for a pop operation selection logic 24 selects first stack pointer register 22. Selected stack pointer 36, equal to first stack pointer 32, is provided to adder/subtractor 28 and also is provided to a memory module (not shown in FIG. 1) in which a stack is implemented. First stack pointer 32 is written to second stack pointer register 26. Adder/ subtractor 28 generates updated stack pointer 40 by subtracting constant 38 from selected stack pointer 32, to be written into first stack pointer register 22. Constant 38 reflects the offset between the top of the stack and the memory location following the top of the stack.

When control indicator 30 calls for a push operation, selection logic 24 selects second stack pointer register 26. Selected stack pointer 36, equal to second stack pointer 34, is provided to adder/subtractor 28 and also is provided to the memory module. Second stack pointer 36 is written to first stack pointer register 22. Adder/subtractor 28 generates updated stack pointer 40 by adding constant 38 from selected stack pointer 36, to be written into second stack pointer register 26.

Figure 2:
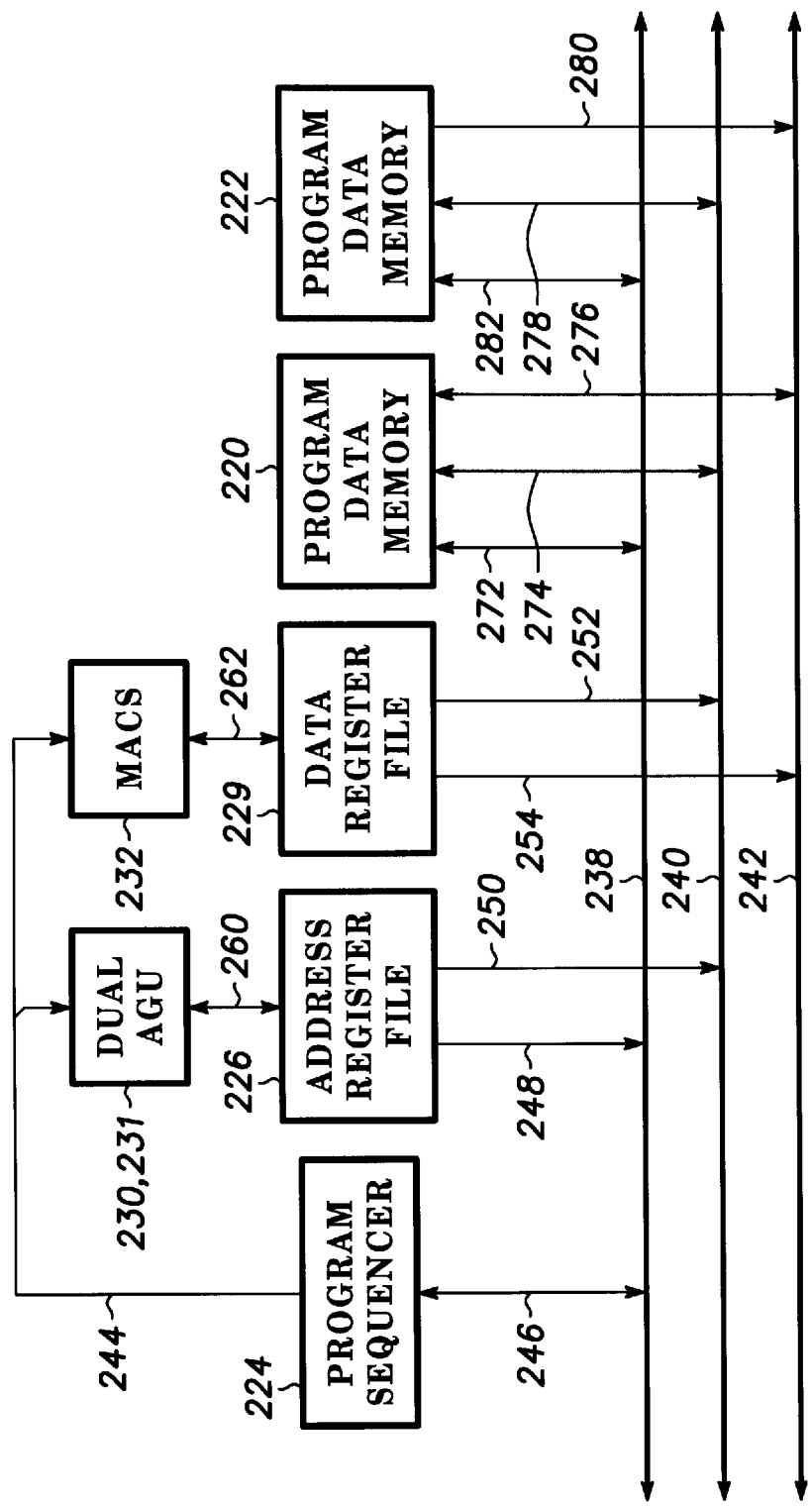
FIG. 2 is a block diagram of a processor having an address generating unit, according to an embodiment of the invention.

FIG. 2 is a block diagram of a processing system 110 having an address generation unit, according to an embodiment of the invention. Preferably, processing system 110 is characterized by having a Very Long Instruction Word (i.e.—VLIW), but it is not necessary. A VLIW is used in parallel processing systems. Each VLIW comprises of a plurality of instructions that are executed in a parallel manner by various portions of processing system 110.

The processing system 110 has internal memory modules 220, 222, an address register file 226, a program sequencer 224, data register files 228 and 229, address generation units (AGU) 230 and 231 and multiply and accumulate (MAC) units that are collectively denoted 232. AGUs 230 and 231 are coupled to the address register file 226 via internal bus 260. MACs units 232 are coupled to the data register files 228 and 229 via internal bus 262. The program sequencer 224 is coupled via the instruction bus 244 to AGUs 230 and 231 and MACs 232.

Processing system 110 further includes a program bus 238, a first data bus 240 and a second data bus 242. Program bus 238 is coupled to the program sequencer 224 via bus 246, to memory modules 220, 222 via buses 272 and 282 respectively. Data buses 240 and 242 are coupled to address register file 226 via buses 248 and 250, and to data register files 228, 229 via buses 252, 254. Data buses 240 and 242 are coupled to memory modules 220, 222 via buses 274–280.

Program sequencer 224 fetches a VLIW from one of memory modules 220 and 222 and dispatches portions of the VILW to MACs 232, AGUs 230 and 231. AGUs 230 and 231 provide memory modules 220 and 222 addresses of either data or VLIW to be fetched during a next operating cycle. Usually, a stack is implemented in one of memory modules 220 and 222.

Figure 3:
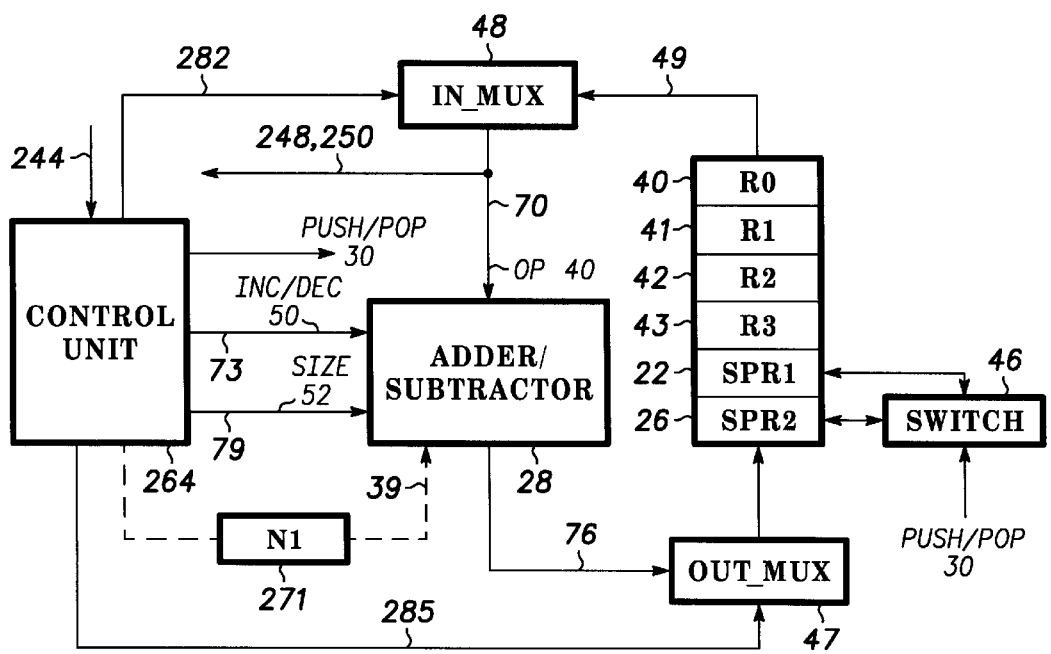
FIG. 3 is a block diagram of an address generating unit, according to an embodiment of the invention.

FIG. 3 is a block diagram of an address generation unit (i.e.—AGU) 230 and a portion 280 of address register file 226 within processing system 110, according to an embodiment of the invention.

AGU 230 is comprised of control unit 264, register N1 271 and adder/subtractor 28. Portion 280 of address register file 226 is comprised of a plurality of registers R0, R1, R2, R3 40–43, first stack pointer register (i.e.—SPR1) 22, second stack pointer register (i.e.—SPR2) 26, a switch 46, and two multiplexers IN_MUX 48 and OUT_MUX 47. Control unit 264 receives an instruction from program sequencer 224, decodes the instruction and provides control indicator 30 and a plurality of control signals to portion 280, to adder/subtractor 28 and to N1 271, for controlling a generation of an updated address, such as a selected stack pointer and an updated stack pointer.

Control unit 264 sends control signals, via buses 282 and 285 to IN_MUX 48 and to OUT_MUX 47 for selecting which register is involved in the generation of an updated address. IN_MUX 48 is coupled, via bus 49 to resisters R0,R1,R2,R3 40–43, SPR1 22 and SPR2 26, and according to the control signal it receives it selects which register will supply its content to adder/subtractor 28 and to a memory modules 222 and 22 via buses 248 and 250. Adder/subtractor 28 receives the content of the selected register via bus 70, receives a control signal INC/DEC 50 that calls either for an addition operation or a subtraction operation and either constant 38 or a SIZE 52 signal and generates an updated address. INC/DEC 50 is provided by control unit 264, via bus 73. Constant 38 is provided either by control unit 264 via bus 79 or by N1 271 via bus 39. SIZE 52 is provided by control unit 264.

Adder/subtractor 28 generates an updated address to the selected register, via bus 76, OUT_MUX 47 and bus 248.

During a first clock cycle, control unit 264 decodes an instruction that was provided by program sequencer 224, and determines whether there is a need to generate an updated address.

The generation of an updated address that is not a stack pointer address usually involves either adding or subtracting SIZE 52 from the content of a register out of R0–R3 40–43. SIZE 52 is generated during the decoding stage of an instruction and reflects the length of an operand that is associated with the instruction. For example, the instruction "MOVE.2L (R1)+" involves the generation of an updated address that equals the content of R1 41 plus eight. "2L" means an eight-byte data word, thus SIZE=8. R1 41 is selected and INC/DEC=1. The instruction "MOVE.B (R2)–" involves the generation of an updated address that equals the content of R2 42 minus one. "B" means a single byte data word, thus SIZE=1. R2 42 is selected and INC/DEC=0.

If there is a need to execute a push operation, control unit 264 generates and sends control signals to IN_MUX 48 and to OUT_MUX 47 for selecting SPR2 26 and accordingly second stack pointer 34, generates and sends control indicator 30 to switch 46 indicating that during a first phase of a second clock cycle the content of SPR2 26 is to be written to SPR1 22. Control unit 264 generates and provides INC/DEC 50 (INC/DEC=1) to adder/subtractor 28.

During a first phase of a second clock cycle, second stack pointer 34 is send, via switch 46, to SPR1 22, and is sent via IN_MUX 48 to adder/subtractor 28. Second stack pointer 34 is also provided to one of memory modules 220 and 222. Adder/subtractor 28 generates updated stack pointer 40 by adding constant 38 to selected stack pointer 36.

During a second phase of a second clock cycle, adder/subtractor 28 sends updated stack pointer 40, via OUT_MUX 47 to SPR2 26.

If there is a need to execute a pop operation, control unit 264 generates and sends control signals to IN_MUX 48 and to OUT_MUX 47 for selecting SPR1 22 and accordingly first stack pointer 32, generates and sends control indicator 30 to switch 46 indicating that during a first phase of a second clock cycle first stack pointer 32 stored within SPR1 22 is to be written to SPR2 26. Control unit 264 further generates and provides INC/DEC 50 (INC/DEC=0) to adder/subtractor 28.

During a first phase of a second clock cycle, first stack pointer 32 is send, via switch 46, to SPR2 26, and is sent via IN_MUX 48 to adder/subtractor 28. First stack pointer 32 is also provided to one of memory modules 220 and 222 in which a stack is implemented. Adder/subtractor 28 generates updated stack pointer 40 by subtracting constant 38 from selected stack pointer 36.

During a second phase of a second clock cycle, adder/subtractor 28 sends updated stack pointer 40, via OUT_MUX 47 to SPR1 22.

Figure 4:
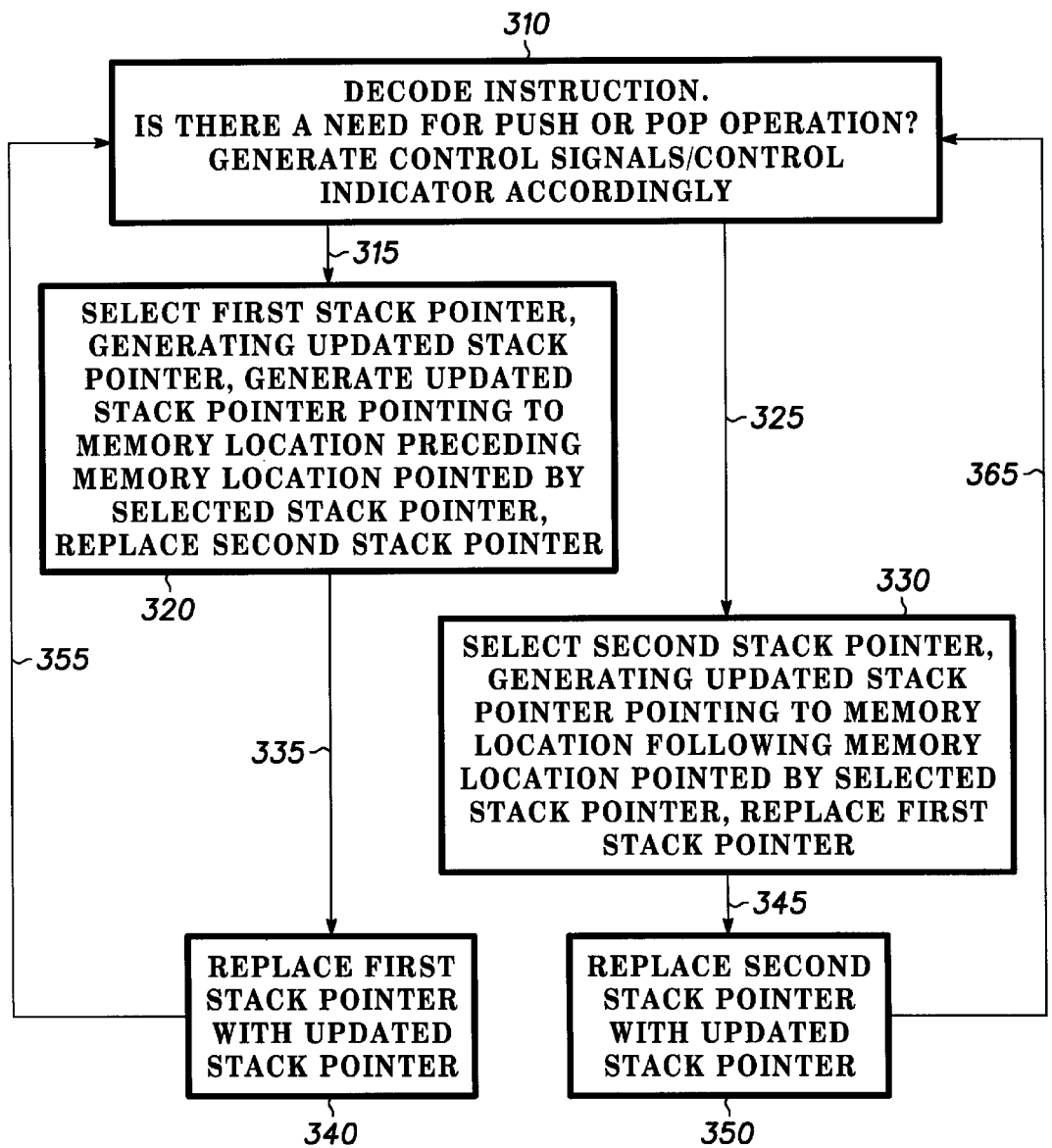
FIG. 4 illustrates in flow chart form, a method for performing stack operations, in accordance with the present invention.

FIG. 4 illustrates in a flow chart form, a method 300 for performing stack operations within a processing system. Rectangular boxes 310, 320, 330, 340 and 350 represent steps of method 300. As indicated by paths 315 and 325 step 310 can be followed by steps 320 and 330. As indicated by paths 335 and 345, steps 320 and 330 are followed by steps 340 and 350. As indicated by paths 355 and 365, steps 340 and 350 are followed by step 310.

Conveniently, method 300 is executed in a processing system having a pipelined architecture. Instructions are processed in a plurality of stages such as program pre-fetch stage, program fetch stage, dispatch and decode stage, address generation stage, and execute stage. Step 310 is performed during the dispatch and decode stage. Steps 320–350 are performed during the address generation stage. For convenience of explanation, FIG. 4 only illustrates these two stages.

Method 300 comprising the steps of:

During step 310 and during a first clock cycle, decoding an instruction and determining whether there is a need to execute a stack operation out of a push operation and a pop operation and accordingly generating a control indicator calling for the stack operation.

As indicated by paths 315 and 335, if the stack operation is a pop operation performing steps 320 and 340.

During step 320 and during a first phase of a second clock cycle, providing a selected stack pointer 36 pointing to a top of a stack. Replacing a pointer to a memory location following the point of the stack with the selected stack pointer. Generating an updated stack pointer 40 pointing to memory location preceding a memory location pointed by selected stack pointer 36. Sending selected stack pointer 36 to a memory module in which a stack is implemented, for allowing data to be read from the memory location pointed by the selected stack pointer.

Conveniently, during step 320 and during a first phase of a second clock cycle, providing a selected stack pointer 36 from a first stack pointer register 22, writing selected stack pointer 36 to second stack pointer register 26, sending selected stack pointer 36 to adder/subtractor 28, generating an updated stack pointer 40 by subtracting constant 38 from selected stack pointer 36, and sending selected stack pointer 36 to a memory module in which a stack is implemented, so that data can be read from a top of a stack during the execute stage During step 340 and during a second phase of a second clock cycle, replacing selected stack pointer 36 that was provided during the first phase of the second clock cycle with updated stack pointer 40. Conveniently, during step 340 and during a second phase of a second clock cycle, writing updated stack pointer 40 to first stack pointer register 22.

As indicated by paths 325 and 345, if the stack operation is a push operation performing steps 330 and 350. During step 330 and during a first phase of a second clock cycle, providing selected stack pointer 36 pointing to a memory location following a top of a stack. Replacing a pointer to the top of the stack with selected stack pointer 36. Generating updated stack pointer 40 pointing to memory location following a memory location pointed by selected stack pointer 36. Sending selected stack pointer 36 to a memory module in which a stack is implemented, for allowing data to be written to the memory location pointed by selected stack pointer 36. Conveniently, during step 330 and during a first phase of a second clock cycle, providing a selected stack pointer 36 from a second stack pointer register 36, writing selected stack pointer 36 to first stack pointer register 22, sending selected stack pointer 36 to adder/subtractor 28, generating an updated stack pointer 40 by adding constant 38 to selected stack pointer 36, and sending selected stack pointer 36 to a memory module in which a stack is implemented, so that data can be written to the memory location following the top of the stack during the execute stage.

During step 340 and during a second phase of a second clock cycle, replacing selected stack pointer 36 that was provided during the first phase of the second clock cycle with updated stack pointer 40. Conveniently, during step 350 and during a second phase of a second clock cycle, writing updated stack pointer 40 to second stack pointer register 26.

As indicated by paths 355 and 365 steps 340 and 350 are followed by step 310.

Thus, there has been described herein an embodiment including at least one preferred embodiment of a device and method for performing stack operations. It will be apparent to those skilled in the art that the disclosed subject matter may be modified in numerous ways and may assume many embodiments other than the preferred form specifically set out and described above.

Accordingly, the above disclosed subject matter is to be considered illustrative and not restrictive, and to the maximum extent allowed by law, it is intended by the appended claims to cover all such modifications and other embodiments which fall within the true spirit and scope of the present invention. The scope of the invention is to be determined by the broadest permissible interpretation of the following claims and their equivalents rather than the foregoing detailed description.

We claim:

1. A method for performing pop operations within a processing system, the method comprising the steps of:

during a first clock cycle, decoding an instruction and determining whether there is a need to execute a pop operation and accordingly generating a control indicator calling for the pop operation;

during a first phase of a second clock cycle, providing a selected stack pointer, the selected stack pointer pointing to a top of a stack, replacing a pointer to a memory location following the point of the stack with the selected stack pointer, generating an updated stack pointer pointing to a memory location preceding the memory location pointed by the selected stack pointer, sending the selected stack pointer to a memory module in which a stack is implemented, for allowing data to be read from the memory location pointed by the selected stack pointer; and during a second phase of the second clock cycle, replacing the selected stack pointer that was provided during the first phase of the second clock cycle with the updated stack pointer.

2. The method of claim 1 wherein the first stack pointer is stored in a first stack pointer register and the second stack pointer is stored in a second stack pointer register, and after a pop operation is completed the second stack pointer register stores the selected stack pointer and the first stack pointer register stores the updated stack pointer.

3. The method of claim 1 wherein the updated stack pointer is generated by decrementing the selected stack pointer.

4. A method for performing push operations within a processing system, the method comprising the steps of:

during a first clock cycle, decoding an instruction and determining whether there is a need to execute a push operation and accordingly generating a control indicator calling for the push operation;

during a first phase of a second clock cycle, providing a selected stack pointer, the selected stack pointer pointing to a memory location following a top of a stack, replacing a pointer to the top of the stack with the selected stack pointer, generating an updated stack pointer pointing to a memory location following a memory location pointed by the selected stack pointer, sending the selected stack pointer to a memory module in which a stack is implemented, for allowing data to be written to the memory location pointed by the selected stack pointer; and during a second phase of the second clock cycle, replacing the selected stack pointer that was provided during the first phase of the second clock cycle with the updated stack pointer.

5. The method of claim 4 wherein the first stack pointer is stored in a first stack pointer register, the second stack pointer is stored in a second stack pointer register, and after a push operation is completed the first stack pointer register stores the selected stack pointer and the second stack pointer register stores the updated stack pointer.

6. The method of claim 4 wherein the updated stack pointer is generated by incrementing the selected stack pointer.

7. A method for performing stack operations within a processing system, the method comprising the steps of:

during a first clock cycle, decoding an instruction and determining whether there is a need to execute a stack operation out of a pop operation and a push operation and accordingly generating a control indicator calling for the stack operation;

if the stack operation is a pop operation performing steps comprising:

during a first phase of a second clock cycle, providing a selected stack pointer, the selected stack pointer pointing to a top of a stack, replacing a pointer to a memory location following the point of the stack with the selected stack pointer, generating an updated stack pointer pointing to memory location preceding a memory location pointed by the selected stack pointer, sending the selected stack pointer to a memory module in which a stack is implemented, for allowing data to be read from the memory location pointed by the selected stack pointer;

during a second phase of the second clock cycle, replacing the selected stack pointer that was provided during the first phase of the second clock cycle with the updated stack pointer;

if the stack operation is a push operation performing steps comprising:

during a first phase of a second clock cycle, providing a selected stack pointer, the selected stack pointer pointing to a memory location following a top of a stack, replacing a pointer to the top of the stack with the selected stack pointer, generating an updated stack pointer pointing to memory location following a memory location pointed by the selected stack pointer, sending the selected stack pointer to a memory module in which a stack is implemented, for allowing data to be written to the memory location pointed by the selected stack pointer; and during a second phase of the second clock cycle, replacing the selected stack pointer that was provided during the first phase of the second clock cycle with the updated stack pointer.

8. The method of claim 7 wherein the first stack pointer is stored in a first stack pointer register and the second stack pointer is stored in a second stack pointer register;

wherein after a pop operation is completed the first stack pointer register stores the selected stack pointer and the second stack pointer register stores the updated stack pointer; and wherein after a push operation is completed the first stack pointer register stores the updated stack pointer and the second stack pointer register stores the selected stack pointer.

9. A device for performing stack operations within a processing system, the device comprising of:

a decoder for decoding an instruction and generating a control indicator calling for the stack operation, accordingly;

a first stack pointer register, for storing a first stack pointer;

a second stack pointer register, for storing a second stack pointer;

an adder, coupled to the decoder, for receiving a selected stack pointer and a constant and generating an updated stack pointer according to the control indictor; and a selection logic, coupled to the first and the second stack pointers, to the adder and to the decoder, for receiving the control indicator and accordingly selecting a selected stack pointer out of the first and second stack pointer, the selected stack pointer is stored in a selected stack pointer register, sending the selected stack pointer to the stack pointer register that was not selected, sending the selected stack pointer to the adder and to a memory module in which a stack is implemented, sending the updated stack pointer from the adder to the selected stack pointer register.

10. The device of claim 9 wherein when the control indicator calls for a pop operation the selection logic selects the first stack pointer register.

11. The device of claim 9 wherein the first stack pointer points to a top of a stack; and wherein the second stack pointer points to a memory location following the top of the stack.

12. The device of claim 9 wherein the selection logic is adapted to select the selected stack pointer, to send the selected stack pointer to the stack pointer register that was not selected, and to send the selected stack pointer to the adder during a first phase of a clock cycle and to send the updated stack pointer from the adder to the selected stack pointer register during a second phase of clock cycle.

13. A device for generating addresses, the device comprising:

a first stack pointer register, for storing a first stack pointer;

a second stack pointer register, for storing a second stack pointer;

a plurality of registers, for storing memory locations other than the first and second stack pointers;

two multiplexers, for selecting a selected register out of the first stack pointer register, second stack pointer register and the plurality of registers;

an adder, coupled to the multiplexers, for receiving the content of the selected register and a constant and generating an updated content to be sent to the selected register;

a switch, coupled to the first and second stack pointer registers, for allowing the first stack pointer to be written to the second stack pointer register and for allowing the second stack pointer to be written to the first stack pointer register;

a control unit, coupled to the first and the second stack pointer registers, to the adder and to the decoder, adapted to receive an instruction, for decoding the instruction, and for generating and providing control signals and a control indicator accordingly.

14. The device of claim 13 wherein when an instruction calls for a pop operation, the control unit sends control signals that cause the two multiplexers to select the first stack pointer register, cause the switch to write the first stack pointer to the second stack pointer register, cause the adder to generate an updated stack pointer by adding a constant to the selected stack pointer.

15. The device of claim 13 wherein when an instruction calls for a push operation, the control unit sends control signals that cause the two multiplexers to select the second stack pointer register, cause the switch to write the second stack pointer to the first stack pointer register, cause the adder to generate an updated stack pointer by subtracting a constant from the selected stack pointer.

* * * * *